(12) United States Patent
Hopkins (10) Patent No.: US 7,798,501 B1
(45) Date of Patent: Sep. 21, 2010

(54) APPARATUS FOR TRANSPORTING AND STORING MULTIPLE STANDS

(76) Inventor: John D. Hopkins, 2755 E. Berry Rd., Rives Junction, MI (US) 49277

( * ) Notice: Subject to any disclaimer, the term of this patent is extended or adjusted under 35 U.S.C. 154(b) by 696 days.

(21) Appl. No.: 11/452,497

(22) Filed: Jun. 14, 2006

(51) Int. Cl.
*B62B 3/00* (2006.01)

(52) U.S. Cl. .................................. 280/47.35; 280/47.34

(58) Field of Classification Search .................. 211/13, 211/59.2, 162, 26, 151, 153, 169.1; 280/79.7, 280/79.11, 47.34, 87.05, 651, 32.6, 47.11, 280/47.131, 62, 80.1, 87.01, 47.35, 47.36, 280/47.41; 248/129, 128, 127
See application file for complete search history.

(56) References Cited

U.S. PATENT DOCUMENTS

| | | | |
|---|---|---|---|
| 1,563,057 A | | 11/1925 | Williams |
| 2,414,277 A | | 1/1947 | Shepard, Jr., et al. |
| 2,419,422 A | * | 4/1947 | Schulein ..................... 280/651 |
| 2,552,453 A | | 5/1951 | Pintar |
| 2,555,178 A | | 5/1951 | Young |
| 2,622,541 A | | 12/1952 | Smart |
| 2,852,327 A | | 9/1958 | Mason |
| 2,982,422 A | | 5/1961 | Asproyerakas |
| 3,121,963 A | * | 2/1964 | Nolan .......................... 37/265 |
| 3,197,224 A | * | 7/1965 | Kappen ..................... 280/651 |
| 3,907,116 A | | 9/1975 | Wolf et al. |
| 4,315,633 A | | 2/1982 | Boeddeker et al. |
| 4,356,923 A | | 11/1982 | Young et al. |
| 4,474,297 A | | 10/1984 | Zucker |
| 4,744,489 A | | 5/1988 | Binder et al. |
| 4,971,205 A | * | 11/1990 | Hopkins ..................... 211/13.1 |
| 5,495,951 A | | 3/1996 | Biasini |
| 5,833,083 A | * | 11/1998 | Miller ......................... 211/134 |
| 5,857,685 A | * | 1/1999 | Phillips et al. ........... 280/47.35 |
| 5,875,652 A | | 3/1999 | Davis |
| 5,876,049 A | * | 3/1999 | Spear et al. ............. 280/47.371 |
| 6,024,376 A | * | 2/2000 | Golichowski et al. ..... 280/655.1 |
| 6,135,299 A | * | 10/2000 | Burgess ...................... 211/194 |
| 6,173,847 B1 | * | 1/2001 | Zellner et al. ............... 211/186 |
| 6,220,611 B1 | * | 4/2001 | Shapiro ................... 280/47.34 |
| 6,386,560 B2 | * | 5/2002 | Calender .................. 280/47.34 |
| 6,581,945 B1 | * | 6/2003 | Shapiro ....................... 280/30 |
| 6,659,294 B1 | * | 12/2003 | Simard ..................... 211/181.1 |
| 6,669,213 B2 | * | 12/2003 | Woerner ................... 280/47.35 |
| 6,896,272 B1 | * | 5/2005 | Burton .................. 280/47.371 |
| 6,916,028 B2 | * | 7/2005 | Shapiro ................... 280/47.34 |

(Continued)

*Primary Examiner*—Hau V Phan
(74) *Attorney, Agent, or Firm*—Young Basile (57) ABSTRACT

An apparatus for transporting and storing a plurality of stands. Each stand has an elongate, vertically oriented pole having a longitudinal axis and a base supporting the pole with a plurality of legs extending perpendicular to the longitudinal axis of the pole. The apparatus includes a substantially planar base having a front end and a rear end, and a plurality of wheels supporting the substantially planar base. At least one shelf assembly is supported above the substantially planar base. Each shelf assembly has a first half and a second half. A substantially unobstructed slot extends upward from the substantially planar base wherein the first and second halves of the at least one shelf assembly are disposed on opposite sides of the slot. The plurality stands are receivable on the substantially planar base and the at least one shelf assembly, and the poles of said stands are receivable in the slot for arranging the stands on the substantially planar base and the at least one shelf assembly in a vertically staggered configuration.

17 Claims, 6 Drawing Sheets

U.S. PATENT DOCUMENTS 7,219,905 B1 * 5/2007 Wilson ..................... 280/79.7
7,458,441 B2 * 12/2008 Hu ............................ 186/45
2003/0080523 A1 * 5/2003 Crespo-Ortiz ............ 280/47.34
2003/0205875 A1 11/2003 Ondrasik et al.

* cited by examiner

APPARATUS FOR TRANSPORTING AND STORING MULTIPLE STANDS

FIELD OF THE INVENTION

The present invention relates to the field of equipment storage and handling, and more particularly, the present invention relates to an apparatus for transporting and storing multiple stands having elongate vertical poles.

BACKGROUND OF THE INVENTION

Stands having elongate poles projecting from a base having legs perpendicular to the longitudinal axis of the pole are used for a variety of purposes. One important use of such stands is in hospitals where IV stands are used to support intravenous fluid bags and intravenous fluid pumping equipment, blood pressure monitors, lights and the like. Such stands are also used by musicians as music stands. Another use arises in public spaces such as banks and convention centers, were such stands are used as aisle stanchions for crowd control purposes. Although the particular structure of the stand varies by application, these types of stands are almost always used in applications where the stands must be transported and stored according to changing needs. For example, during the course of hospital operations, IV stands are moved from room to room, transported to storage rooms where the batteries of the equipment mounted to the stand may be recharged, and transported to washing stations where the poles are cleaned and sanitized. Moving these types stands one or two at a time results in a significant expenditure of staff time and effort. Furthermore, the size and awkward stature of these stands renders them difficult to transport, creating a potential safety hazard.

A number of structures have been previously used to transport music stands. These carts typically include a pair of rails through which one of the legs of the stand extends at an angle with respect to the rails. In this manner, the stands may nest against each other. However, such a structure would not be operative to transport IV stands. Currently known music stand carts require that the music stand be transported in a non-vertical position, or that the cart include an inclined rail upon which the music stands are supported. For this reasons, currently known music stands are not capable or transporting certain other types of stands having elongate poles. For example, IV stands cannot be transported non-vertically due to the large, heavy equipment mounted toward the top of IV stands. Furthermore, where the stands being transported are tall, a cart utilizing inclined rails may cause the tops of some of the stands to be taller than doorways.

It would be desirable to have an apparatus for transporting a large number of stands having elongate poles quickly and efficiently wherein the number of stands that may be transported is maximized, and the overall height is minimized.

SUMMARY OF THE INVENTION

The present invention provides an apparatus for transporting and storing a plurality of stands. Each stand has an elongate vertically oriented pole having a longitudinal axis and a base supporting the pole with a plurality of legs extending perpendicular to the longitudinal axis of the pole.

The apparatus has a substantially planar base having a front end and a rear end, and a plurality of wheels supporting the substantially planar base. At least one shelf assembly is supported above the substantially planar base. Each shelf assembly has a first half and a second half. A substantially unobstructed slot extends upward from the substantially planar base wherein the first and second halves of the at least one shelf assembly are disposed on opposite sides of the slot. The plurality of stands are receivable on the substantially planar base and the at least one shelf assembly, and the poles of said stands are receivable in the slot for arranging the stands on the substantially planar base and the at least one shelf assembly in a vertically staggered configuration.

The apparatus may include an end wall at the front end of the substantially planar base for retaining the stands on each of the plurality of shelf assemblies. The apparatus may also include a cover assembly above the plurality of shelf assemblies for preventing the stands from tipping during transport. The cover assembly includes first and second halves that substantially overlie the first and second halves of the shelf assemblies.

The apparatus further includes a handle that extends upwardly from the rear end of the substantially planar base. The handle has a first end and is pivotally attached to the substantially planar base, and a second end that is releasably attachable to the substantially planar base. The handle is movable between a first position, wherein the second end of the handle is connected to the substantially planar base so that the handle retains the stands on the plurality of shelf assemblies and the base, and a second position, wherein the second end of the handle is pivoted away from the substantially planar base for loading or unloading the stands.

The shelf assemblies, the cover assembly, and the substantially planar base may have apertures formed through them to allow fluids to drain. Furthermore, the shelf assemblies, the cover assembly, and the substantially planar base may be fabricated from expanded metal.

In order to reduce the overall height of the apparatus, the wheels may be inset with respect to the substantially planar base so that the highest point of each wheel lies above the top surface of the substantially planar base.

DESCRIPTION OF THE DRAWINGS

The description herein makes reference to the accompanying drawings wherein like referenced numerals refer to like parts throughout several views and wherein.

DETAILED DESCRIPTION OF THE INVENTION

Referring to the drawings, the present invention will now be described in detail with reference to the disclosed embodiment.

Figure 1:
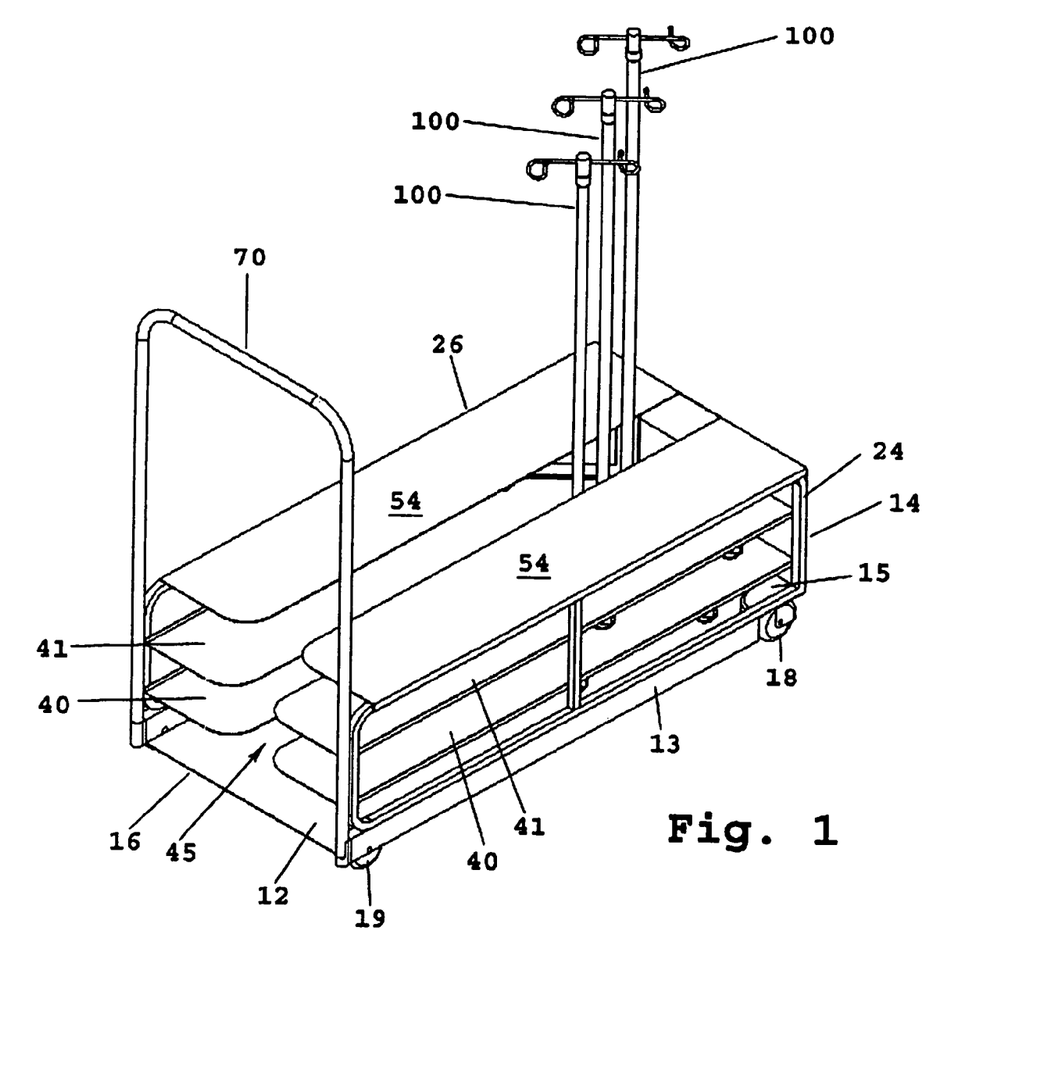
FIG. 1 is a perspective view of the apparatus for transporting and storing multiple stands of the present invention.
Figure 2:
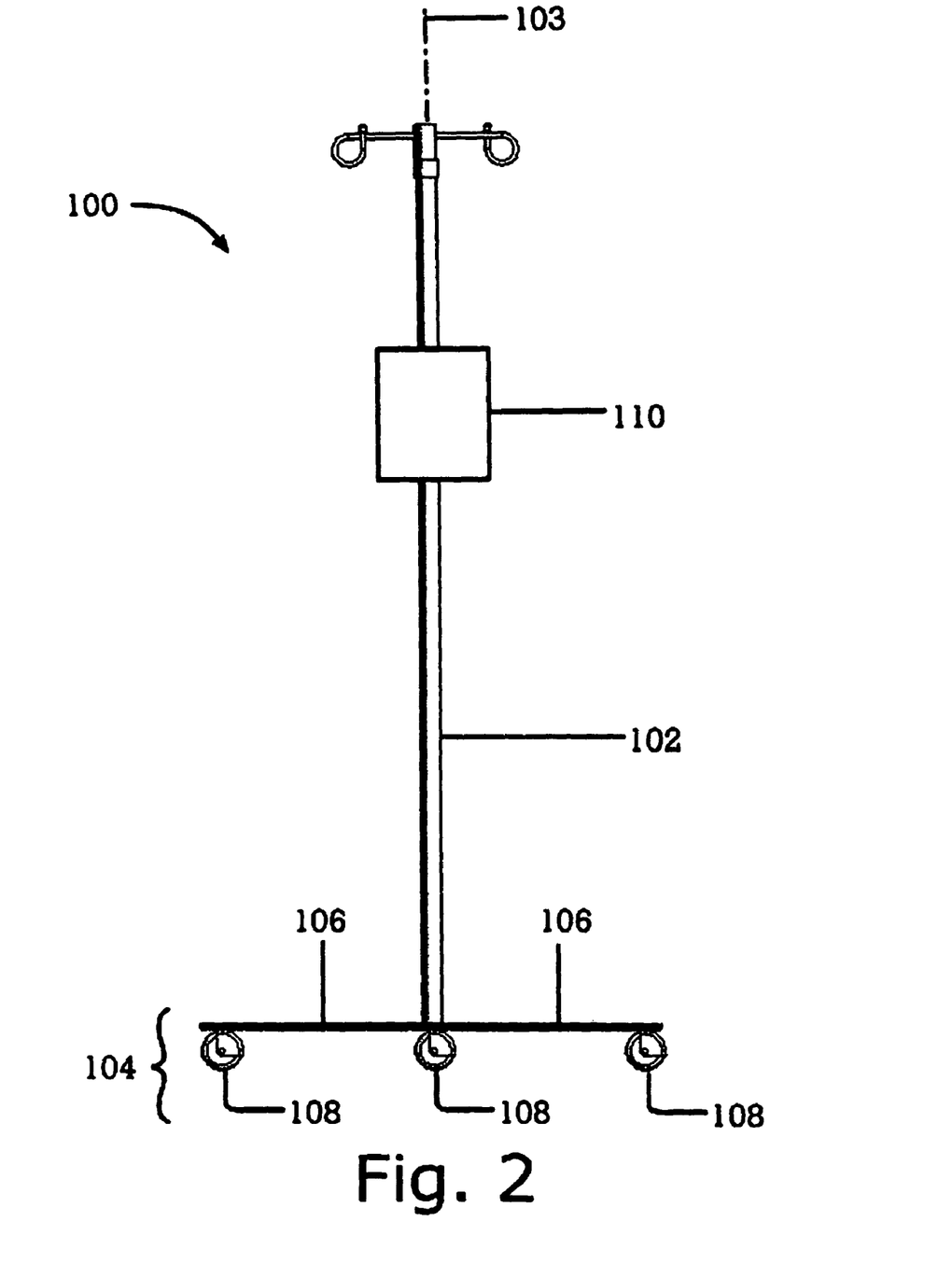
FIG. 2 an illustration of a conventional IV stand.
Figure 3:
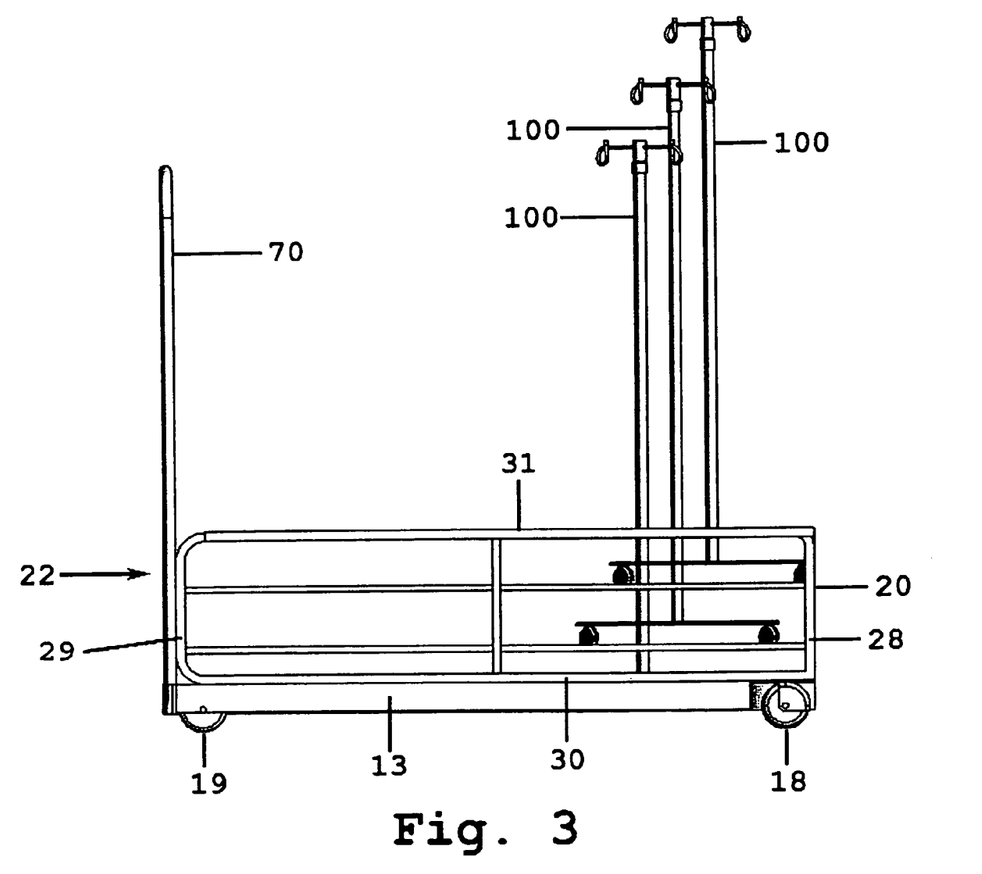
FIG. 3 is a side view of the apparatus for transporting and storing multiple stands of the present invention.
Figure 4:
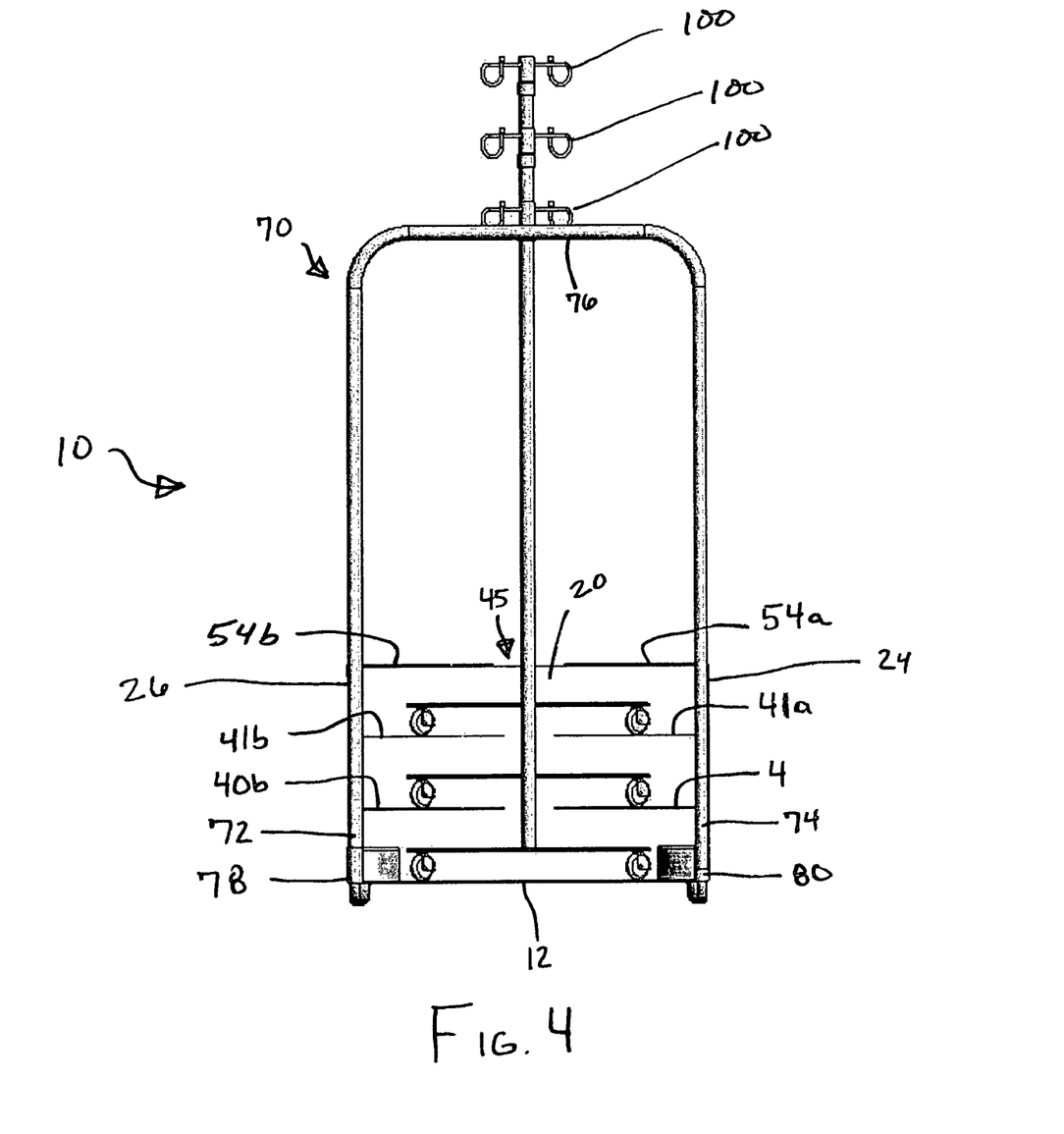
FIG. 4 is an end view of the apparatus for transporting and storing multiple stands of the present invention.

FIG. 1 shows the apparatus 10 of the present invention for transporting and storing multiple IV stands 100. Each stand 100 includes an elongate vertically oriented pole 102 having a longitudinal axis 103, as shown in FIG. 2. Each pole 102 is supported by a base 104 that includes a plurality of legs 106 which extend perpendicular to the longitudinal axis 103 of the pole 102. So that the stands 100 may be easily moved and positioned, a wheel 108 may be attached to each of the legs 106. Each stand 100 may be used to support equipment 110 such as intravenous pumping equipment, blood pressure monitors, lights and the like. It should be noted however, that although the apparatus 10 is described herein as being used with IV stands 100 the apparatus is not limited to this use. Rather, the apparatus 10 may be used to transport any type of stand 100 having an elongate pole extending from a base having a plurality of legs extending therefrom.

The apparatus 10 has a substantially planar base 12 supported by a plurality of wheels, namely pivotally mounted wheels 18 and non-pivotally mounted wheels 19. A plurality of shelf assemblies 40, 41 are supported above the substantially planar base 12 such that each shelf assembly 40, 41 is vertically spaced from each other shelf assembly 40, 41. Additionally, a slot 45 extends through each of the shelf assemblies 40, 41. In this manner, the base 104 of each stand 100 may be received on the base portion 12 or on one of the shelf assemblies 40, 41 in a vertically staggered configuration, such that the poles 102 of the stands 100 extend vertically through the slots 45 in the shelf assemblies 40, 41, as will be explained in greater detail herein.

The base portion 12 is a substantially planar member upon which the remaining structure of the apparatus 10 may be supported. The base portion 12 is substantially rectangular, and includes a front end 14 opposite a rear end 16. The base portion 12 may be fabricated from any suitable material, such as metal or plastic.

In order to support the base portion 12, a substantially U-shaped rail 13 extends along each side of the base portion 12, such that the open side of the substantially U-shaped rail 13 faces downward. At the rear end 14 of the base portion 12, the non-pivotally mounted wheels 19 are disposed within the channels formed by the U-shaped rails 13. At the front end 16 of the base portion 12, the pivotally mounted wheels 18 are disposed within wheel wells 15 that are inset into the base portion 12. In order to reduce the overall height of the apparatus 10, the pivotally mounted wheels 18 and the non-pivotally mounted wheels 19 are connected to the wheel wells 15 and the rails 13, respectively, so the base portion 12 is lower than the tops of the wheels 18, 19.

In order to support the shelf assemblies 40, 41, a first side wall 24 and a second side wall 26 are disposed at opposite sides of the base portion 12, and extend upward from each substantially U-shaped rail 13. The first side wall 24 and the second side wall 26 are substantially similar in construction, each having a substantially structure which extends substantially perpendicular to the base portion 12. The first side wall 24 and the second side wall 26 may be fabricated from metal or plastic, and each side wall 24, 26 may be cast or molded as a single piece, or may be fabricated from components; for example, as a tubular framework. The first side wall 24 and the second side wall 26 each have a front end 28 adjacent to the front end 14 of the base portion 12, and a rear end 29 adjacent to the rear end 16 of the base portion 12. Furthermore, the first side wall 24 and the second side wall 26 each have a bottom 30 and a top 31.

In like manner to the side walls 26, 28, the end wall 20 is a substantially planar member which may be fabricated from metal or plastic as a single piece, or from components such as tubes that form a framework. The end wall 20 extends upward from the base portion 12 at the front end 14 of the base portion 12, and the first side wall 26 and the second side wall 28 are extend perpendicular to the end wall 20 at opposite sides of the end wall 20. Opposite the end wall 20, an open end 22 of the apparatus 10 is located at the rear end 16 of the base portion 12, between the first side wall 26 and the second side wall 28.

Figure 5:
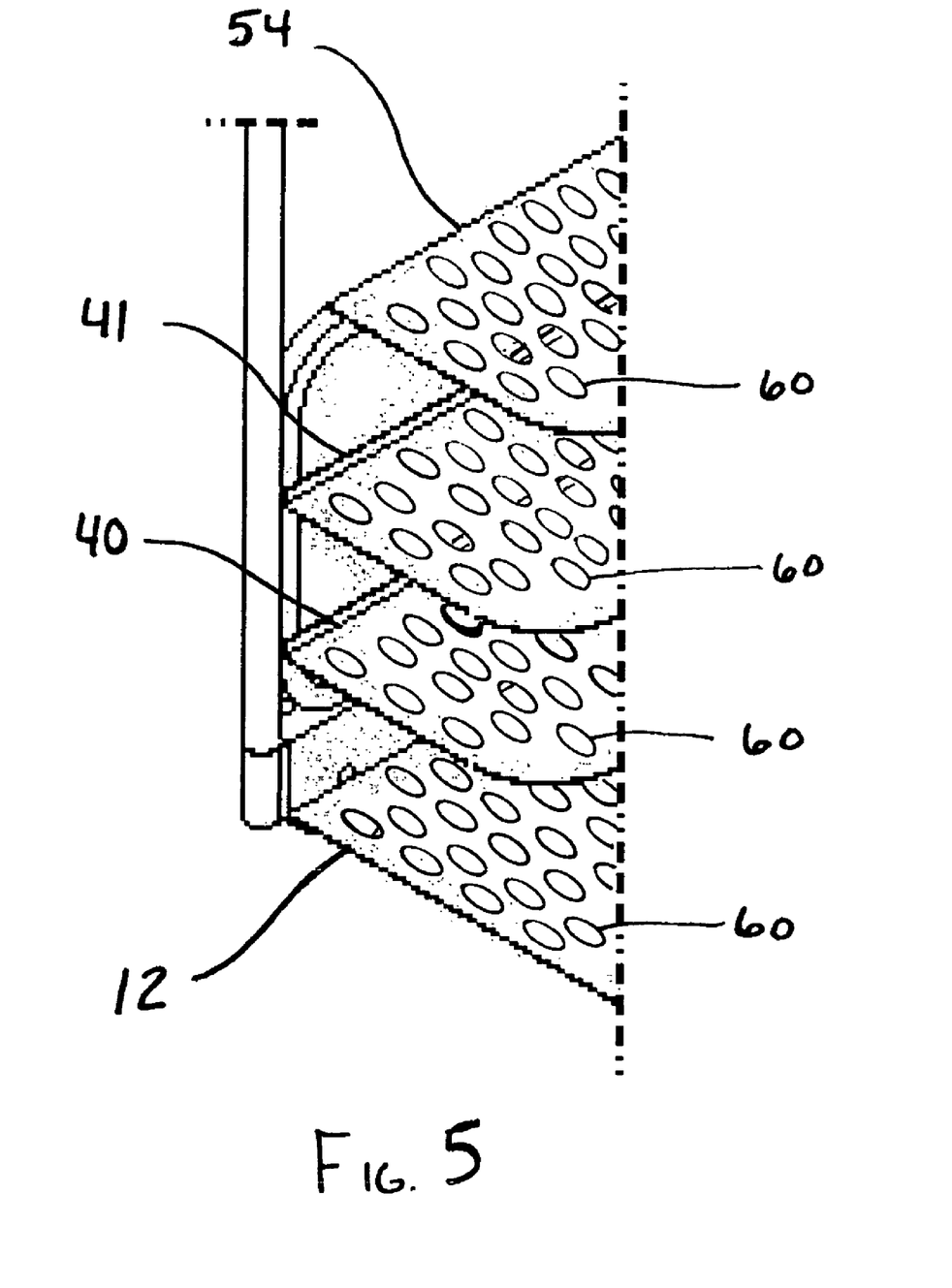
FIG. 5 is partial, detail view of the apparatus for transporting and storing multiple stands of the present invention wherein a plurality of apertures are formed through the substantially planar base, the shelf assemblies, and the cover assembly.

The plurality of shelf assemblies 40, 41 are supported above the substantially planar base portion 12 by the first side wall 24, the second side wall 26, and the end wall 20. Particularly, the apparatus 10 includes a first shelf assembly 40 spaced vertically above the base portion 12, and a second shelf assembly 41 spaced vertically above the first shelf assembly 40. The first and second shelf assemblies 40, 41 are substantially similar, each having two halves which are separated from one another by the slot 45. Particularly, the first shelf assembly 40 has a first portion 40a and a second portion 40b, as shown in FIG. 5. The first portion 40a and the second portion 40b extend from the front end 14 of base portion 12 to the rear end 16 of base portion 12, and are separated by the slot 45, which also extends between the front end 14 and the rear end 16 of the base portion 12. The first portion 40a and the second portion 40b are connected to the first side wall 24 and the second side wall 26, respectively by conventional fasteners or welds. Alternatively, the first portion 40a and the second portion 40b may be formed integrally with the side walls 24, 26, respectively. The first portion 40a and the second portion 40b are also connected to the end wall 20 in like manner. The first portion 40a and the second portion 40b are both substantially planar, and provide a surface upon which the base 104 of each stand 100 may be received. The first portion 40a and the second portion 40b may be fabricated from metal or plastic. The second assembly 41 also has a first portion 41a and a second portion 41b, which are substantially identical in construction to the first and second portions 40a, 40b of the first shelf assembly 40. However, as the second shelf assembly 41 is spaced above the first shelf assembly 40, the first and second portions 40a, 40b of the second shelf assembly 41 substantially overlie the first and second portions 40a, 40b of the first shelf assembly 40.

In order to restrain the stands 100 from tipping during transport, a cover assembly 54 may be positioned above the second shelf assembly 41. The cover assembly 54 is similar in construction to the shelf assemblies 40, 41, but differs in that the cover assembly 54 is not intended to support the stands 100. The cover assembly 54 includes substantially similar first and second portions 54a, 54b which are separated by the slot 45, which extends from the front end 14 to the rear end 16 of the base portion 12. The first portion 54a of the cover assembly 54 is connected to the first side wall 24 and the end wall 20 in vertical alignment with the top 31 of the first side wall 24. In like manner, the second portion 54b of the cover assembly 54 is connected to the second side wall 26 and the end wall 20 in vertical alignment with the top 31 of the second side wall 24. The first and second portions 54a, 54b of the cover assembly 54 may be fabricated from metal, plastic, or any other suitable material.

Figure 6:
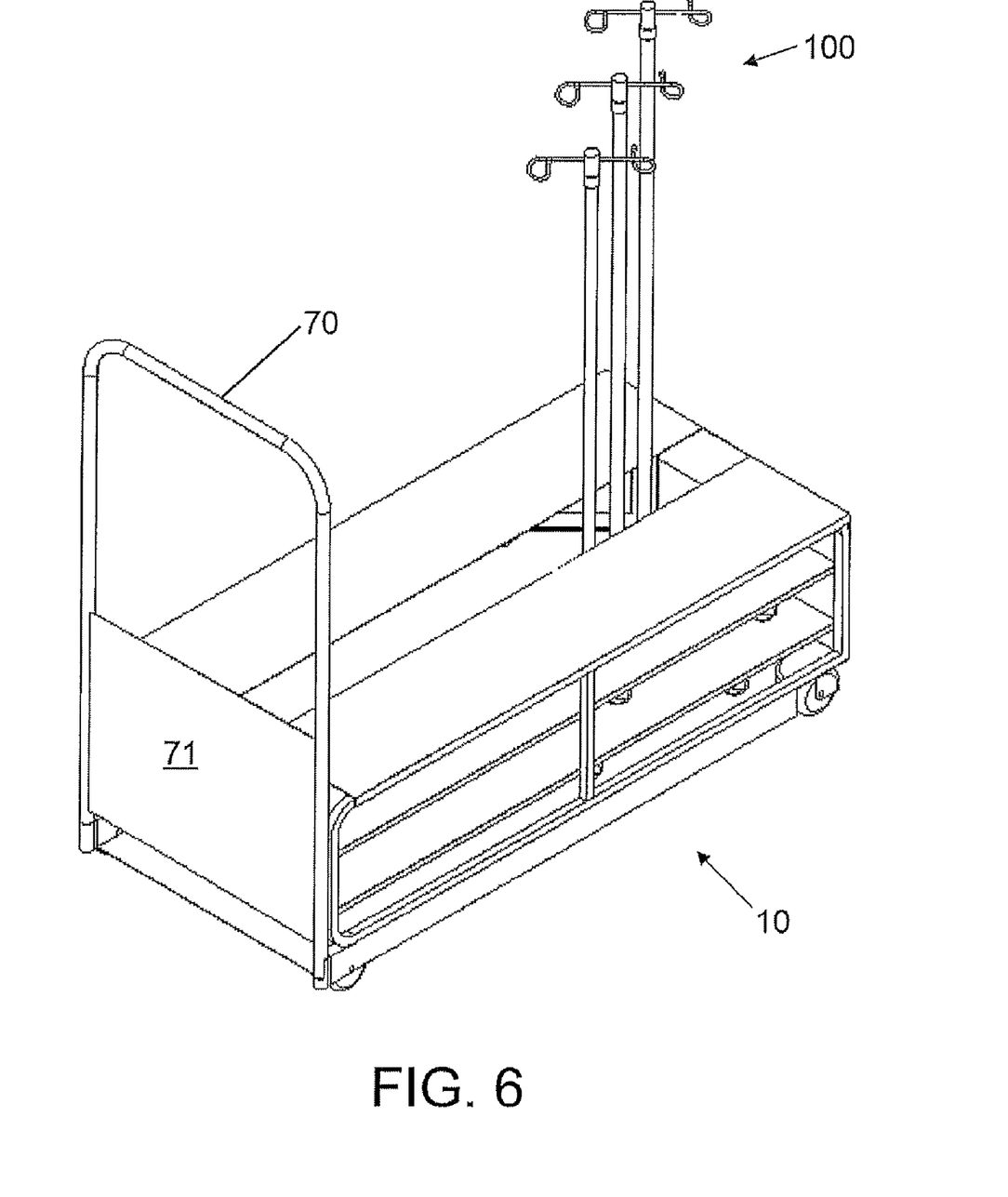
FIG. 6 is a perspective view of an embodiment of the apparatus for transporting and storing multiple stands of the present invention including a handle portion having a cover member.

In order to retain the stands within the apparatus 10 during transport, and to provide a means for pushing the apparatus 10, a handle portion 70 is included. The handle portion 70 is substantially U-shaped, having a horizontally extending top portion 76 located intermediate of a vertically extending first end portion 72 and a vertically extending second end portion 74. The handle portion 70 includes a substantially planar cover member 71, as shown in FIG. 6, which is connected to the handle portion 70 to restrain the stands 100 from leaving the apparatus 10 during transport. In order to connect the handle portion 70 to the base portion 12, a pivot joint 78 and a connector 80 are connected to the base portion 12 adjacent to the rear end 16. The first end portion 72 of the handle portion 70 is connected to the pivot joint 78 for pivotal motion of the handle portion 70 with respect to the base portion 12. The second end portion 74 of the handle portion 70 is releasably attachable to the connector 80. For example, the pivot joint 78 and the connector 80 may both be tubular sleeves in which the first end portion 72 and the second end portion 74 are slidably receivable, wherein the first end portion 72 is longer than the second end portion 74 so that vertical displacement of the handle portion 70 releases the second end portion 74 from the connector 80 while the first end portion 72 remains connected to the pivot joint 78. As another example, the pivot joint 78 may be a tubular member that does not allow vertical displacement of the handle portion 70, and the connector 80 may be a clip, clamp, or other suitable structure that is engageable with the second end portion 74 of the handle portion 70. In this manner, the handle portion 70 may move between a first position and a second position. In the first position, the second end portion 74 of the handle portion 70 is connected to the connector 80, thereby allowing the handle portion 70 to retain the stands 100 upon the base 12 and the shelf assemblies 40, 41 by obstructing the open end 22. In the second position, the second end portion 74 of the handle portion 70 is pivoted away from the base portion 12, thereby allowing stands 100 to be loaded or unloaded from the apparatus 10.

In order to allow washing of the apparatus 10 and the poles 100 that are carried on the apparatus 10, a plurality of apertures 60 may be provided so that fluids, such as water, may drain from the apparatus 10, as shown in FIG. 5. The apertures 60 may extend through any or all of the substantially planar base 12, the first shelf assembly 40, the second shelf assembly 41 and the cover assembly 54. The size and shape of the apertures 60 is not critical. Consequently, the apertures 60 may be formed through the shelf assemblies 40, 41 and the substantially planar base 12 in any size or shape that does not prevent the stands 100 from being disposed on the shelf assemblies 40, 41 and the substantially planar base 12. Similarly, the apertures 60 may be formed through the cover assembly 54 in any size or shape that does not prevent the cover assembly 54 from restraining the stands 100 against tipping. The apertures 60 may be formed in any conventional manner, such as molding, drilling, or cutting. Furthermore, in order to provide apertures 60 through the substantially planar base 12, the first shelf assembly 40, the second shelf assembly 41 and the cover assembly 54, these structures may be fabricated from expanded metal.

In use, a user wishing to transport a plurality of stands 100 with the apparatus 10 of the present invention for transporting and storing multiple stands first loads the stands 100 onto the apparatus 10. This is accomplished by first moving the handle portion 70 to the second position wherein the second end portion 74 of the handle portion 70 is pivoted away from the connector 80. Thus, the open end 22 of the apparatus 10 is not obstructed by the handle portion 70. The user then loads stands 100 onto the apparatus 10 in a nested fashion in order to maximize the number of stands 100 which can be transported by the apparatus 10. To this end, the user first places a stand 100 on the base portion 12 by moving it through the open end 22 and sliding the stand 100 until it is adjacent to the end wall 20 such that the pole 102 of the stand 100 extends vertically through the slot 45 in each shelf assembly 40, 41, and through the slot 68 in the cover assembly 54. The user then loads a stand 100 onto the upper shelf assembly 41, and then the user loads another stand 100 onto the lower shelf assembly 40, in similar fashion. Once the user has completed loading stands 100 onto the apparatus 10, the handle portion 70 may be moved from the second position to the first position, wherein the second end portion 74 of the handle portion 70 is retained by the connector 80. The user then rolls the apparatus 10 to its final destination, such as an IV stand washing station, where the plurality of stands 100 may be washed while they are on the apparatus 10. In this manner, if apertures are formed through any or all of the substantially planar base 12, the shelf assemblies 40, 41, or the cover assembly 54, the apparatus 10 may quickly be drained and dried. Once this is completed, the user may transport the apparatus 10 to its final destination, such as a storage room where the plurality of stands 100 may remain on the apparatus 10 while the equipment 110 carried upon the stands 100 may be connected to a power supply for the purpose of recharging the batteries of the equipment 110.

The invention claimed is:

1. An apparatus for transporting and storing a plurality of stands, each having an elongate, vertically oriented pole having a longitudinal axis and a base supporting the pole with a plurality of legs extending perpendicular to the longitudinal axis of the pole, comprising:

a substantially planar base having a front end and a rear end;

a plurality of wheels supporting said substantially planar base;

at least one shelf assembly supported above said substantially planar base, and said at least one shelf assembly having a first half and a second half;

a substantially unobstructed slot extending upward from said substantially planar base wherein said first and second halves of said at least one shelf assembly are disposed on opposite sides of said slot;

said plurality stands receivable on said substantially planar base and said at least one shelf assembly, and said poles of said stands receivable in said slot for arranging said stands on said substantially planar base and said at least one shelf assembly in a vertically staggered configuration and for retaining said stands on said substantially planar base and said at least one shelf assembly;

an end wall at said front end of said substantially planar base for retaining said stands on said substantially planar base and said at least one shelf assembly;

a handle attached to said substantially planar base and moveable between a first position and a second position; and a cover member that is connected to said handle portion, wherein said cover member is positioned along said rear end of said substantially planar base and adjacent to said at least one shelf assembly to restrain the stands from leaving said substantially planar base and said at least one shelf assembly at said rear end of said substantially planar base when said handle is in said first position, and said cover member does not restrain movement of the stands off of said substantially planar base and said at least one shelf assembly at said rear end of said substantially planar base when said handle is in said second position.

2. The apparatus stated in claim 1, further comprising:

said at least one shelf assembly and said substantially planar base having a plurality of apertures formed therethrough for allowing fluids to drain from said at least one shelf assembly.

3. The apparatus stated in claim 1, further comprising:

a first side wall connected to a substantially planar base and extending from said front end of said substantially planar base to said rear end of said substantially planar base, wherein said first half of said at least one shelf assembly is supported by said side wall;

a second side wall connected to said substantially planar base opposite said first side wall, and said second side wall extending from said front end of said substantially planar base to said rear end of said substantially planar base, wherein said second half of said at least one shelf assembly is supported by said second side wall;

a cover assembly having first and second cover halves disposed on opposite sides of said slot wherein said first and second halves of said cover assembly substantially overlie said first and second halves of said at least one shelf assembly, respectively, for retaining said stands on said substantially planar base and said at least one shelf assembly; and said first side wall and second side wall each having an upper surface that defines a maximum height for each said side wall with respect to said substantially planar base, wherein said first and second cover halves of said cover assembly are connected to said first and second side walls, respectively, adjacent to said uppermost surfaces thereof.

4. The apparatus stated in claim 3, further comprising:
said cover assembly having a plurality of apertures formed therethrough for allowing fluids to drain from said cover assembly.

5. The apparatus stated in claim 1, further comprising:
said at least one shelf assembly and said substantially planar base fabricated from expanded metal.

6. The apparatus stated in claim 1, further comprising:
said handle including a u-shaped member having a first end pivotally attached to said substantially planar base at a first side of said substantially planar base, and a second end releasably attachable to said substantially planar base at a second side of said substantially planar base, and said handle movable between said first position, wherein said second end of said handle is connected to said rear end of said substantially planar base so that said handle retains said stands on said at least one shelf assembly and said base, and said second position wherein said second end of said handle is pivoted away from said substantially planar base for loading or unloading said stands.

7. An apparatus for transporting and storing a plurality of stands, each having an elongate, vertically oriented pole having a longitudinal axis and a base supporting the pole with a plurality of legs extending perpendicular to the longitudinal axis of the pole, comprising:

a substantially planar base having a front end, a rear end, a first side, and a second side;

a plurality of wheels supporting said substantially planar base;

a first side wall connected to said substantially planar base and extending along said first side of said substantially planar base from said front end of said substantially planar base to said rear end of said substantially planar base;

a second side wall connected to said substantially planar base along said second side of said substantially planar base and opposite said first side wall, and said second side wall extending from said front end of said substantially planar base to said rear end of said substantially planar base;

a plurality of shelf assemblies supported above said substantially planar base, and each said shelf assembly having a first half that is supported by said first side wall and a second half that is supported by said second side wall;

a cover assembly supported above said substantially planar base having first and second cover halves that are supported by an uppermost surface of each of said first side wall and said second side wall, respectively, and substantially overlie said first and second halves of said plurality of shelf assemblies, respectively;

a substantially unobstructed slot extending upward from said substantially planar base wherein said first and second halves of each said shelf assembly are disposed on opposite sides of said slot and said first and second cover halves are disposed on opposite sides of said slot; and said plurality stands receivable on said substantially planar base and said shelf assemblies, and said poles of said stands receivable in said slot for arranging said stands on said substantially planar base and said shelf assemblies in a vertically staggered configuration.

8. The apparatus stated in claim 7, further comprising:
said shelf assemblies having a plurality of apertures formed therethrough for allowing fluids to drain from said shelf assemblies.

9. The apparatus stated in claim 7, further comprising:
said substantially planar base having a plurality of apertures formed therethrough for allowing fluids to drain from said substantially planar base.

10. The apparatus stated in claim 7, further comprising:
said cover assembly having a plurality of apertures formed therethrough for allowing fluids to drain from said cover assembly.

11. The apparatus stated in claim 7, further comprising:
said substantially planar base, said shelf assemblies, and said cover assembly fabricated from expanded metal.

12. The apparatus stated in claim 7, further comprising:
a pivot joint disposed on said substantially planar base along said rear end thereof and adjacent to said first side thereof;

a connector disposed on said substantially planar base at said rear end thereof and adjacent to said second side thereof; and a substantially u-shaped handle that extends from a first end to a second end, wherein said first end of said substantially u-shaped handle is connected to said pivot joint for pivotal motion with respect to said substantially planar base about an axis that extends substantially perpendicular to said substantially planar base, and said second end of said substantially u-shaped handle is releasably connectable to said connector, wherein said substantially u-shaped handle is moveable between a first position, wherein said handle is substantially upright and extends across said rear end of said substantially planar base and said second end of said handle is connected to said connector, such that said handle retains said stands on said at least one shelf assembly and said substantially planar base, and a second position, wherein said handle is substantially upright and said second end of said handle is spaced from said connector and is pivoted away from said substantially planar base about said axis, for loading or unloading said stands.

13. The apparatus stated in claim 12, further comprising:
a cover member that is connected to said handle and is positioned adjacent to said substantially planar base and said plurality of shelf assemblies to restrain said stands on said pluralities of shelf assemblies and said substantially planar base when said handle is in said first position.

14. An apparatus for transporting and storage a plurality of stands, each having an elongate, vertically oriented pole having a longitudinal axis and a base supporting the pole with a plurality of legs extending perpendicular to the longitudinal axis of the pole, comprising:

a substantially planar base having a front end and a rear end;

a plurality of wheels supporting said substantially planar base;

a first side wall connected to said substantially planar base and extending from said front end of said substantially planar base to said rear end of said substantially planar base;

a second side wall connected to said substantially planar base opposite said first side wall, and said second side wall extending from said front end of said substantially planar base to said rear end of said substantially planar base;

a plurality of shelf assemblies supported above said substantially planar base, and each said shelf assembly having a first half connected to said first side wall and a second half connected to said second side wall;

a cover assembly supported above said substantially planar base having first and second cover halves that substantially overlie said first and second halves of said plurality of shelf assemblies, respectively;

a plurality of apertures formed through said shelf assemblies, said cover assembly and said substantially planar base for allowing fluids to drain from said shelf assemblies, said cover assembly, and said substantially planar base;

a substantially unobstructed slot extending upward from said substantially planar base wherein said first and second halves of each said shelf assembly are disposed on opposite sides of said slot and said first and second cover halves are disposed on opposite sides of said slot; and said plurality stands receivable on said substantially planar base and said shelf assemblies, and said poles of said stands receivable in said slot for arranging said stands on said substantially planar base and said shelf assemblies in a vertically staggered configuration.

15. The apparatus stated in claim 14, further comprising:

a handle having a first end pivotally attached to said rear end of said substantially planar base, and a second and releasably attachable to said substantially planar base, and said handle movable between a first position wherein said second end of said handle is connected to said substantially planar base so that said handle retains said stands on said plurality of shelf assemblies and said base, and a second position, wherein said second end of said handle is pivoted away from said substantially planar base for loading or unloading said stands.

16. The apparatus stated in claim 15, further comprising:

a cover member connected to said handle for retaining said stands.

17. The apparatus stated in claim 14, further comprising:

said shelf assemblies and said cover assembly fabricated from expanded metal.

* * * * *